Nov. 6, 1934.          L. FREEDMAN          1,979,967
PISTON
Filed Nov. 19, 1932     2 Sheets-Sheet 1
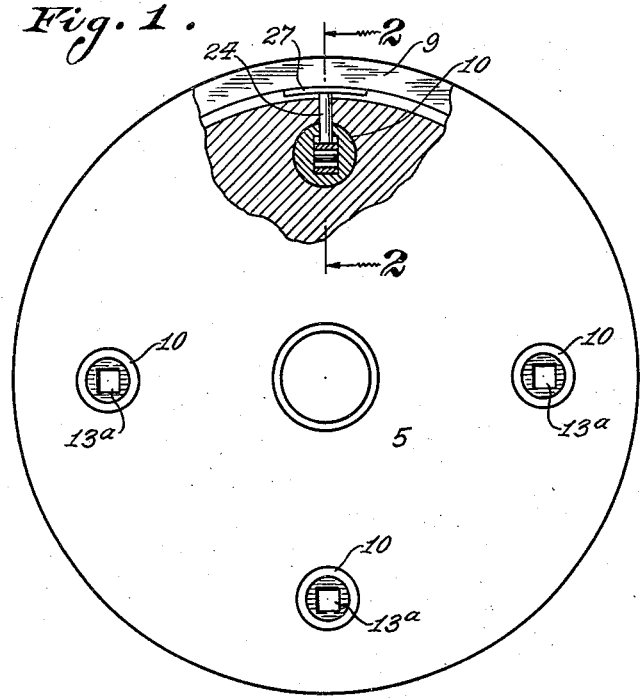
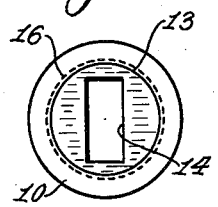
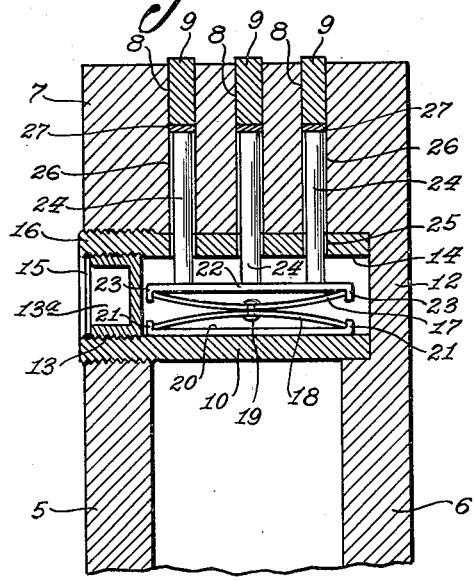
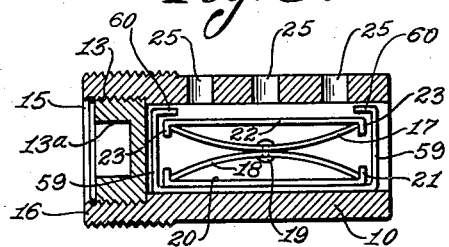
Inventor:
LOUIS FREEDMAN,
By John H. Bruninga
His Attorney.

Nov. 6, 1934.   L. FREEDMAN   1,979,967
PISTON
Filed Nov. 19, 1932   2 Sheets-Sheet 2

Inventor:
LOUIS FREEDMAN,
John H. Bruninga
His Attorney.

Patented Nov. 6, 1934

1,979,967

UNITED STATES PATENT OFFICE 1,979,967

PISTON

Louis Freedman, St. Louis, Mo.; William K. Frielingsdorf administrator of said Louis Freedman, deceased Application November 19, 1932, Serial No. 643,355

5 Claims. (Cl. 309—41)

This invention relates generally to pistons and particularly to expanding devices for the piston rings of locomotives and other steam engines.

In United States Patent No. 1,733,957, issued October 29, 1929, there is described an apparatus for expanding the piston rings of locomotives and other steam engines and the principles of the expanding device described. In the particular embodiment of the piston ring expander shown and described in that patent, some difficulty is encountered in installing the expander in pistons which are already made and in service. The particular embodiment illustrated in that patent is adapted particularly for installation in any piston or pistons in which the expander receiving recesses are cast originally with the piston head.

The present invention is in the nature of another embodiment of the apparatus shown and described in the above mentioned patent and is particularly adapted for installation in old pistons.

An object of this invention, generally stated, is to provide a piston ring expander which may be readily installed in pistons.

Another object of this invention is to provide a piston ring assembly adapted for installation in a cylindrical bore hole which may be formed in a piston.

A further object of this invention is to provide a ring expanding assembly suitable for use in so-called two piece pistons.

A more specific object of this invention is to provide a piston ring expanding device assembled within a cylindrical casing which is adapted to be installed in a cylindrical bore hole or recess formed in the body or head of the piston.

Other objects will become apparent to those skilled in the art when the following description is read in connection with the accompanying drawings, in which:

Figure 1 is an end view partly in section of one form of locomotive piston embodying the present invention.

Figure 2 is a partial sectional view on the line 2—2 of Figure 1.

Figure 3 is a longitudinal section through a housing containing a spring device constructed and assembled in accordance with this invention.

Figure 4 is a front end view of the housing as it appears when the closure plug and spring device appearing in Figure 3 are removed.

Figure 6:
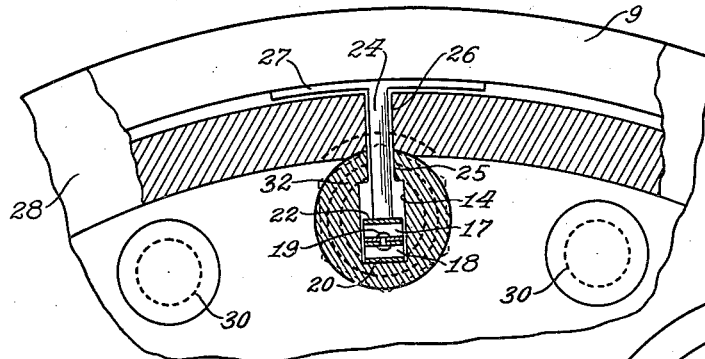
Figure 6 is a part end and part sectional view of a portion of the piston appearing in Figure 5.

In accordance with the present invention, generally stated, an expanding device for piston rings may be installed in old or used piston heads in a convenient manner by providing the operating parts of the expander in a suitable casing having an internal opening of a shape suitable for guiding the parts and preferably being cylindrical on the exterior. Such an assembly may be readily inserted and conveniently retained in a bore hole which is drilled in the usual manner. The casing in which the operating parts of the expander are assembled may be provided with a suitable closure accessible when the head of the cylinder of the engine is removed so as to permit adjustment of the parts within the casing.

In Figures 1 and 2 the invention is shown embodied in a box type piston presenting spaced end walls 5 and 6 and a solid peripheral portion 7, the latter having the usual ring receiving grooves 8 in which the expansible packing rings 9 are fitted.

According to the present invention, a plurality of axially extending casings 10 are mounted in the piston walls 5 and 6 and serve as housings for the spring devices of the ring expanding means hereinafter described. Each casing has an externally threaded end engaged in a threaded opening 11 formed in the piston wall 5, the opposite end of the casing being fitted in a recess 12 in the piston wall 6. In the embodiment illustrated the bore of each casing is open at both ends and may be shaped to present a cylindrical portion 13 and a rectangular portion 14. The cylindrical portion 13 is located at the externally threaded end of the casing and is tapped to receive a threaded closure plug 13a which is secured against accidental loosening by means of a split retaining ring 15 fitted in an annular groove 16. The rectangular portion 14 of the casing bore extends from the cylindrical portion 13 to the opposite end of the casing where it is closed by the bottom wall of the recess 12.

Mounted in each of the casings 10 and arranged for movement up and down within the rectangular recess 14 may be a suitable resilient expanding device which may comprise oppositely bowed leaf springs 17 and 18 having their center portions fastened together as by a rivet 19. The lower spring 18 may rest upon a plate 20 having upturned ends 21 providing shoulders between which the spring 18 may be retained. In the embodiment illustrated, plate 20 preferably corresponds in width to the width of rectangular opening 14 of the casing 10, but with sufficient looseness to permit the same to be moved up and down therein in a direction laterally of the piston as shown in Figure 1. The upper spring 17 may be similarly retained between downturned end portions 23 of an abutment plate 22 which, like plate 20, substantially corresponds in width to the width of the opening 14, but is movable up and down therein. Bearing upon the upper surface of the plate 22 is a series of thrust members 24 which project into the casing 10 through suitable openings 25. These thrust members 24 extend through suitable bores 26 which connect the piston ring grooves 8 with the recesses in which the casing 10 is mounted. Thrust member 24 may be fitted with some looseness in the bores 26 so as to permit the passage of steam thereby in order that the external pressure of the respective piston rings 9 may be acquired from the interior. At their outer ends thrust members 24 may be provided with pressure plates 27 fitted between the bottoms of grooves 8 and packing rings 9. It is apparent that when the parts are assembled in the positions shown in Figures 1 and 2 the pressure of springs 17 and 18 is effective to bias thrust members 24 radially outwardly and thus to expand piston rings 9 against the walls of the cylinder.

When it is desired to take up wear on the packing rings 9, this may be conveniently accomplished by removing the closure plugs 13a of the casing 10 and inserting one or more shims (not shown) between the bottom portions of the casing and the spring supporting plates 20.

With a plurality of such piston ring expanding assemblies mounted in peripherally spaced relation about the head of a piston, it is apparent that the piston rings may be readily and uniformly expanded not only to compensate for wear, but also to more evenly distribute the weight of the piston head and thereby to eliminate, to a great extent, excessive wear on the lower side of the piston rings. It is apparent that the device operating through suitable springs maintains a uniform pressure on each of the piston rings, so that the same is maintained in close contact with the interior of the cylinder. It will be apparent that adjustment of the expanding devices to expand rings 9 in order to take up wear may be accomplished without removing the piston from the cylinder, since by removal of the head of the cylinder, plugs 13a are accessible and may be removed to permit shimming up of the expanding device.

Under some circumstances, it is desirable to provide additional means for preventing possible disassociation of the bowed springs 17 and 18 and abutment plates 20 and 22. A convenient form of such means is illustrated in Figure 3 and may comprise a horizontal portion 58 adapted to extend beneath lower plate 20 and having at each end thereof upwardly extending parts 59 which extend for substantially the full height of the rectangular opening 14. Upstanding parts 59 may have their respective ends turned inwardly as shown at 60 so as to substantially enclose the spring expanding device. With such an arrangement, it is apparent that the upper plate 22 may be held against displacement relative to the other members of the assembly when the piston is removed from the cylinder.

Figure 5:
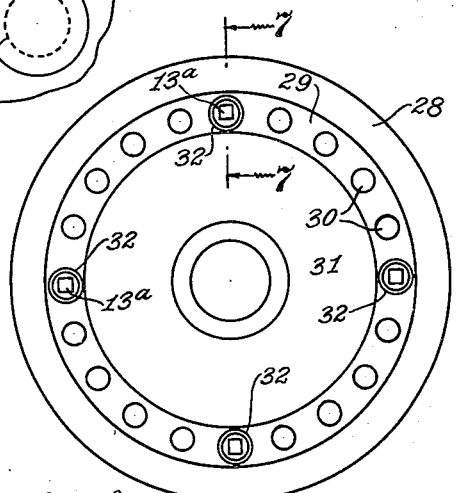
Figure 5 is an end view of a different type of locomotive piston embodying the present invention.
Figure 7:
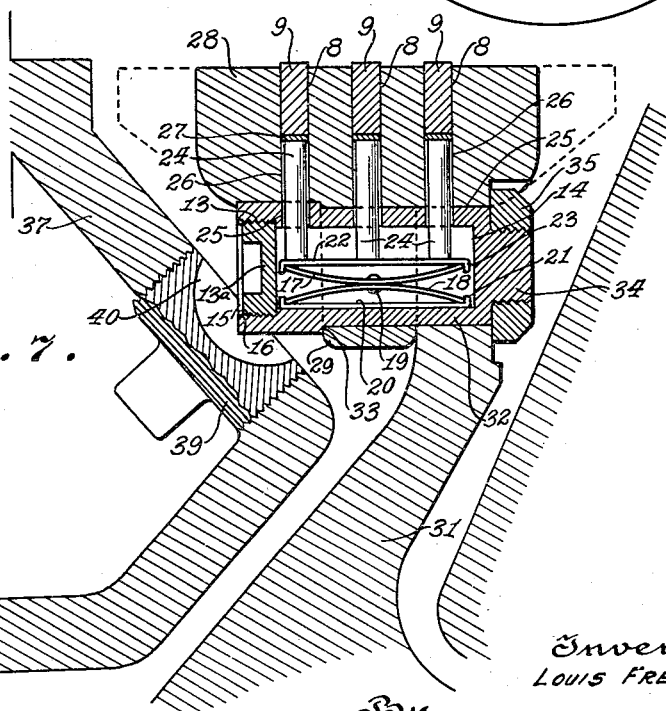
Figure 7 is a sectional view substantially along the line 7—7 of Figure 5. This view also shows a portion of the front cylinder head which is slightly modified to suit the improved piston construction.

In the embodiment shown in Figures 5 to 7 inclusive, the ring expanding assembly is shown as applied to a two piece piston, having a piston head 28 of the bull ring type. As shown, the piston head 28 may be provided with a flange 29 adapted to be secured to body 31 as shown by rivet 30. In accordance with this invention the casing for the piston ring expander assembly may take the form of a bolt 32 which may supplant one or more rivets 30. On the interior of the bolt 32, the adjustable expanding arrangement hereinbefore described may be mounted. It will be understood, of course, that the bolt 32 corresponds in function to the casing 10 hereinbefore described and differs from the casing 10 in that it is provided at one end with a shoulder 33 which operates as the head of the bolt and at the other end is threaded as at 34 to receive a nut 35.

Pistons of the type illustrated in Figures 5, 6 and 7 are often operated in cylinders, the heads of which are generally convex in shape as illustrated in Figure 7. In order to provide sufficient clearance between the end of bolt 32 and the cylinder head 38 when the piston is at the limit of its travel nearest the head 38 a hole may be drilled through the head 38, threaded and provided with a plug 39, as shown in Figure 7. The inner surface of plug 39 may have a cavity 40 into which the front end of the bolt 32 may extend. It will be understood, of course, that one such plug 39 is provided for each of the expander assemblies which are mounted in casings of the type of bolt 32 when the conditions demand.

From the foregoing description it will be understood that the piston of the present invention is not limited to the specific details of construction which have been hereinbefore, for the purpose of illustration, referred to. Furthermore, it is apparent that many modifications of the apparatus will present themselves to those skilled in the art which will not depart from the spirit of this invention and it is to be distinctly understood, therefore, that such modifications and the use of such individual features and sub-combinations of features as do not depart from the spirit of this invention are, although not specifically described herein, contemplated by and within the scope of the appended claims.

Having thus described the invention, what is claimed is:

1. In a piston of the character described having a body and an expansible packing ring mounted therein, a casing removably mounted in the body, an expanding device in said casing, and a thrust member extending through a side wall of said casing and operatively connecting the ring with the expanding device.

2. In a piston of the character described having a body and an expansible packing ring mounted in a groove therein, a cylindrical casing having an external shoulder at one end and threaded part at the other end, an expanding device in said casing, and a thrust member extending through the wall of said casing and operatively connecting the ring with the expanding device.

3. The combination with a piston provided with a perforated groove and an expansible packing ring fitted in said groove of an axially extending casing removably mounted in the body portion of the piston, a spring device in said casing including upper and lower abutment plates, a pair of oppositely bowed leaf springs confined between said plates and having their central portions secured together, said plates having terminal projections engaging the ends of said spring, a casing plate underlying the lower abutment plate and having upwardly extending terminal portions engaging the ends of said abutment plates, said upwardly extending terminal portions of the casing plate terminating in inward projections overlying the upper abutment plate, and a thrust member having its inner end engaging the upper abutment plate and its outer end disposed to engage and expand the packing ring.

4. In combination a cylinder having a front cylinder head presenting a convex piston opposing portion, a piston operating in said cylinder and having an expansible packing ring mounted therein, an axially extending casing mounted in the piston, a removable plug carried by the convex portion of the cylinder head and provided with a recess positioned to provide clearance between the cylinder head and the front end of said casing during the forward stroke of the piston, a spring device housed in said casing, and a thrust member extending outwardly from the spring device and adapted to expand said ring.

5. In a piston of the character described, an expansion unit comprising, a cylindrical casing, laterally expansive means in said casing, said casing having a lateral opening adapted to receive a thrust member engageable with said expansive means, and means for securing said casing in a bore hole.

LOUIS FREEDMAN.